[19] 3,621,223

| [72] | Inventors | Igor Alexeff |
| | | Oakridge; |
| | | Rodger V. Neidigh, Knoxville, Tenn.; |
| | | William Ray Wing, Pella, Iowa |
| [21] | Appl. No. | 861,381 |
| [22] | Filed | Sept. 26, 1969 |
| [45] | Patented | Nov. 16, 1971 |
| [73] | Assignee | The United States of America as represented by the United States Atomic Energy Commission |

[54] HIGH-FREQUENCY SIGNAL CORRELATOR
1 Claim, 5 Drawing Figs.

[52] U.S. Cl. .................................................. 235/181, 235/183, 235/150.53, 324/77 H, 328/151
[51] Int. Cl. ................................................... G06g 7/19
[50] Field of Search .......................................... 235/181, 150.53, 152; 128/2.1

[56] References Cited
UNITED STATES PATENTS

| 3,331,955 | 7/1967 | Norsworthy | 235/181 |
| 3,333,091 | 7/1967 | Masak | 235/181 |
| 3,428,794 | 2/1969 | Norsworthy | 235/181 |
| 3,514,585 | 5/1970 | Norsworthy | 235/181 |

FOREIGN PATENTS

| 1,493,450 | 7/1967 | France | 235/181 |

OTHER REFERENCES

Princeton Applied Research: Signal Correlator Model 100 Nov. 1966 3 pages.
Zimmerman: How to Extend Sampling-Oscilloscope Versability IEEE Spectrum April 1969 p. 79/85

*Primary Examiner*—Malcolm A. Morrison
*Assistant Examiner*—Felix D. Gruber
*Attorney*—Roland A. Anderson ABSTRACT: An automatic frequency correlator computes auto and cross correlation functions of up to 3 GHz. bandwidth over 100 sampling points. The frequency response of the correlator of the present invention is an improvement of three orders of magnitude over that obtainable by prior art correlators, and this is accomplished by providing a new and more convenient means of generating the necessary delay times in the operation of the present correlator.

INVENTORS.
Igor Alexeff
Rodger V. Neidigh
William R. Wing

BY Roland A. Anderson

ATTORNEY.

AUTO-CORRELATED
3-GIGAHERTZ
SINE WAVE

TURBULENT PLASMA, 100 keV
ELECTRONS, ~800 MEGAHERTZ
CORRELATED FOR ONLY A
FEW CYCLES

INVENTORS.
Igor Alexeff
Rodger V. Neidigh
BY William R. Wing

Roland A. Anderson
ATTORNEY.

HIGH-FREQUENCY SIGNAL CORRELATOR

BACKGROUND OF INVENTION

This invention was made in the course of, or under, a contract with the U.S. Atomic Energy Commission.

The concept of computing correlation functions is not new. For example, the U.S. Pat. to Van Horne, No. 2,840,308, issued June 24, 1958, describes a typical prior art correlator. However, such prior devices are generally limited to relatively low frequencies; for example, 250 kHz. or less.

Studies over narrow bandwidths in the MHz and GHz range have grown increasingly important in turbulent plasma research. The existence of waves that repeat over only a few cycles are now known to exist in a plasma. For purposes of beam control and for identification of beam conditions, true correlators having the ability to correlate fluctuations beyond the commonly studied electron cyclotron and plasma frequencies were, prior to the present invention, nonexistent. Thus, there exists a need for a correlator that is capable of not only functioning properly but also doing so accurately for frequencies in the gigaHertz range. The present invention was conceived to meet this need in a manner to be described below.

SUMMARY OF THE INVENTION

It is the object of the present invention to provide an improved correlator for automatically computing auto and cross correlation functions of up to a 3 GHz bandwidth.

The above object has been accomplished in the present invention by providing two sample-and-hold circuits, a time-delay generator, a master pulse generator which simultaneously triggers the time-delay generator and one of the sample-and-hold circuits, and, at the end of the controllable time-delay cycle, the second sample-and-hold circuit is triggered. The outputs of the two holding circuits are then applied to an analogue multiplier until it has has sufficient time to multiply them accurately, and then the multiplier output is connected to a display oscilloscope by way of an integrator or signal averager. The next pulse then arrives from the master generator and the process repeats. This system is adapted to correlate signals in the gigaHertz range, in a manner to be described hereinbelow, which was not possible to achieve with prior art correlators. In the past, correlators have been capable of broad frequency ranges but low maximum frequency capability. Automatic-scanning delay lines to provide delays to high frequencies may be built, but characteristically they operate only over a narrow frequency range. The present system eliminates the automatic scanning delay line. In the present system, the two sample-and-hold circuits and the time-delay generator provide for an equivalent operation while at the same time providing a correlator which has an improvement in frequency response of three orders of magnitude over any prior art correlator.

DESCRIPTION OF THE PREFERRED EMBODIMENTS

The correlation method, upon which the present invention is based, is described by the following known equation:

$$\psi(\tau) = \lim_{n \to \infty} \frac{1}{n} \sum_{i=1}^{n} f(t_i) g(t_i + \tau) \Delta t$$

Figure 1:
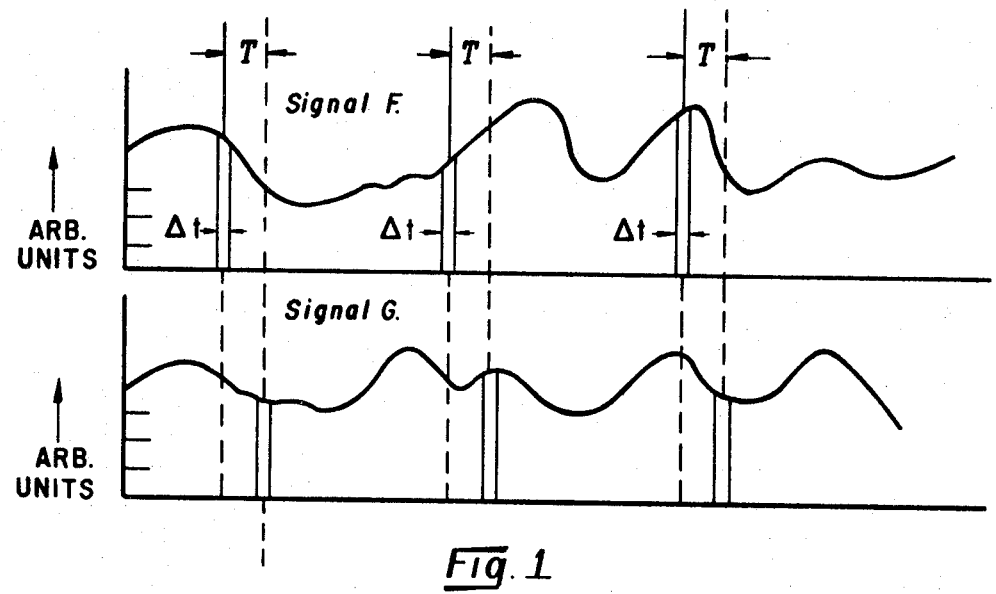
FIG. 1 is a graph of typical oscilloscope traces from a plasma and depicted therein is an example of the sampling operation of the correlator.

This summation formula is explained with the aid of FIG. 1. In FIG. 1 there are depicted the representations of two signals, F and G, whose cross correlation function, $\Psi(\tau)$, is being computed. The figure illustrates sample pairs (one from each signal, each having a width $\Delta t$) being taken; a precise time interval $\tau$ separates the elements of each pair. Other sample pairs are taken at later time intervals. Each sample pair is multiplied and all pairs are averaged to produce the value of the correlation function corresponding to the delay time ($\tau$) between sample pairs.

For the above method to have meaning, it is essential that the signals F and G are stationary in time. For example, if F and G represent variables in a turbulent plasma, the turbulence must be homogeneous on a time scale comparable to or longer than the integration time (time required for $n$ samplings) of the correlator. The order of elements in the sum of the above formula is immaterial and, if the turbulence is truly homogeneous, the elements $t_i$ are indistinguishable. Thus, the sampling process can proceed at random with respect to the phase of any signals of interest. In this way, the correlation function can be built up by taking timed pairs of samples. The sample length is $\Delta t$, the time between pairs is ($t_{i+} - t_i$), and the time $\tau$ separates the elements of a pair. Many such pairs must be taken, multiplied, and averaged to produce the correlation function for each value of $\tau$. Of course, if the function being generated is autocorrelation, the sample pairs would be taken from one signal instead of from two signals as in FIG. 1.

Figure 2:
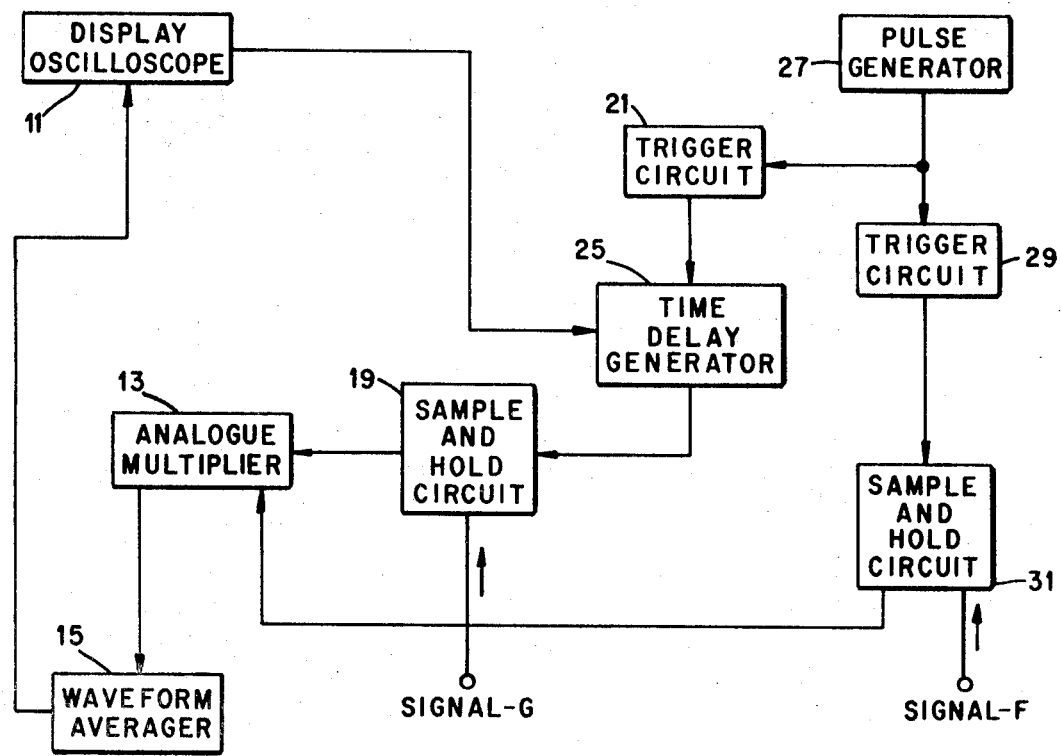
FIG. 2 is a block diagram of one embodiment of the present invention.

The above method of correlation can be accomplished with the device shown in FIG. 2. For any particular taking of a sample pair, the action is started by a pulse from a pulse generator 27 which simultaneously activates two trigger circuits 21 and 29. Immediately, a sample is taken from signal F by sample-and-hold circuit 31 and held on one input to analogue multiplier 13. The sampling of signal G is delayed the required time, $\tau$, by the time-delay generator 25. When the time, $\tau$, has elapsed, sample-and-hold circuit 19 samples signal G and applied it to the second input of analogue multiplier 13.

Analogue multiplier 13 executes the multiplication of the samples and the resulting value is applied to the waveform averager 15. If pulse generator 27 is operating at a repetition rate of 1 kHz., for example, there is ample time for the above-mentioned sample pair to be taken, multiplied, and averaged. At the initiation of the next and succeeding pulses from pulse generator 27, the process repeats and the resulting averaged value of the correlation function is generated in waveform averager 15. In this configuration, the correlation function is generated point-by-point on the display oscilloscope 11. The horizontal sweep of oscilloscope 11 is slow compared to all other time constants of the system. The vertical deflection of the display oscilloscope beam is proportional to the averaged output of the multiplier 13. The time-delay generator 25 is then stepped up to a new value of $\tau$ for the computation of the correlation function of that $\tau$. The horizontal sweep output of the display oscilloscope 11 is used for this stepping function. The sawtooth voltage is so slow compared with other time constants of the system that it may be regarded as a long series of infinitesimal steps, each step being a point on the final computed correlation function; the steps being infinitesimal, the points blend and the correlation function is continuous.

Figure 3:
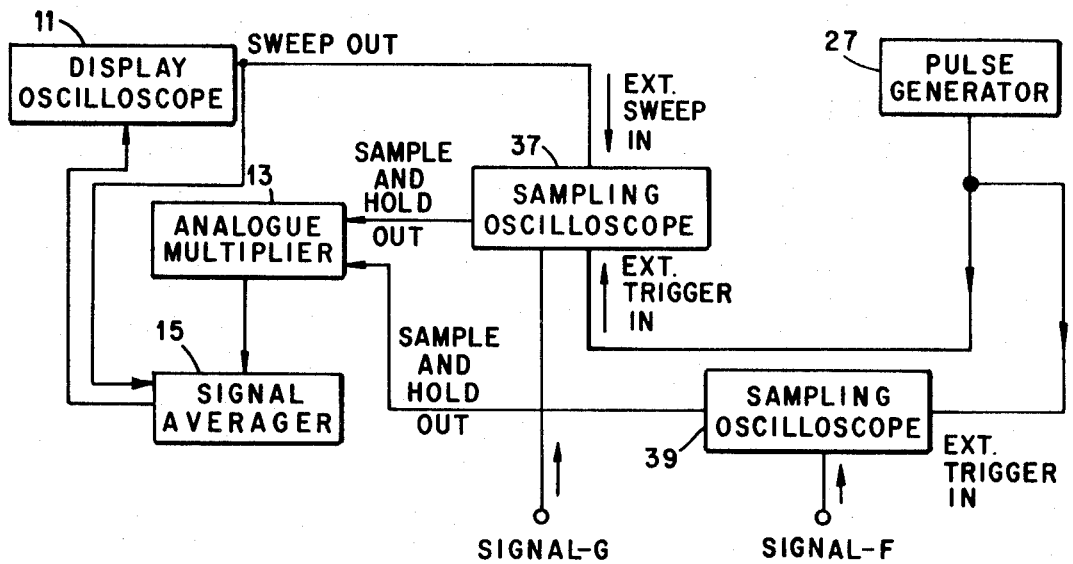
FIG. 3 is a block diagram of another form of the invention utilizing commercially available components.

The system of FIG. 3 illustrates another embodiment of the present invention which is different from the embodiment of FIG. 2 in the following respect. It is different in only one sense. The relative order of time scale for display and averaging may be interchanged. This is permitted if the signal averager 15 is capable of performing many channels of independent averaging simultaneously. For example, a PAR Waveform Eductor, which may be used as the signal averager 15, handles 100 channels independently, and a Northern Scientific digital oscilloscope will average 500 channels independently. In addition to the signal averager 15, the system of FIG. 3 include two sampling oscilloscopes 37 and 39, a pulse generator 27, and analogue multiplier 13, and a display oscilloscope 11.

The sampling oscilloscopes are not used in their normal configuration; only the time-delay generator and sample-and-hold circuit of oscilloscope 37 are used, and in oscilloscope 39 only the sample-and-hold circuit is used (the delay is bypassed by setting the horizontal sweep on "Manual"). Pulse generator 27 simultaneously triggers the time-delay generator in sampling oscilloscope 37 and the sample-and-hold circuit in sampling oscilloscope 39. At the end of the time-delay cycle, the sample-and-hold circuit in oscilloscope 37 is triggered, causing signal G to be sampled. The sample-and-hold outputs of the two sampling oscilloscopes are applied to analogue multiplier 13 until it has had sufficient time to multiply them accurately. The next pulse then arrives from the master generator and the process repeats. It should be noted that the sweep output, the sawtooth of the display oscilloscope 11, is connected to the signal averager 15 to allow it to sweep through its channels of averaging in step with the display oscilloscope 11. In other words, the sweep output from the display oscilloscope 11 function as a synchronizing pulse input to the signal averager 15.

In order to obtain an increasing delay in oscilloscope 37 in a proper sequence, the sweep circuit is set on "External" and it is driven by the sweep of display oscilloscope 11. In this case the $\tau$ increments become infinitesimal and the resolution is limited only by the method of averaging chosen (100 channels in the case of the Waveform Eductor). As mentioned hereinabove, the synchronizing pulse from the sweep output from the display oscilloscope to the signal averager 15 allows the unit 15 to sweep through its channels of averaging in step with the display oscilloscope 11. This sweep, being coordinated with the display oscilloscope, provides that the desired range of $\tau$ is scanned for each sweep of the display oscilloscope, with $\tau$ being constant for a short increment of time. If, in oscilloscope 37, the equivalent sweep speed has been set for one nanosecond per cm., for example, and the beam is 5 cm. from the screen edge, then a 5-nsec. delay is generated between the pulse generator signal arrival and the sample being taken. In this case the many sample pairs will be multiplied by the unit 13 and averaged by the unit 15 for this value of $\tau$ to be applied to the vertical deflection of oscilloscope 11 as one dot. The value of $\tau$ is then increased and in this way a chain of values of the correlation function, each for a succeedingly larger time-delay $\tau$, will be generated, displayed, and held on the face of display oscilloscope 11.

Typically, in this oscilloscope embodiment, the delay can be ranged from 100 $\mu$sec. to 1.0 nsec. It is also typical in oscilloscopes to be able to select, for example, 100 values of the vertical deflection to be displayed in a single sweep of the beam.

The number of samples and the width of the oscilloscope trace set an upper and lower bound on the bandwidth of the correlation function that can be examined at any one setting. If the lowest usable frequency is arbitrarily defined as one cycle per trace length, then, at any particular equivalent sweep speed, the greatest usable frequency will be about 20 times the lowest. With the range of sweep speeds provided, the lowest frequency can vary from 10 kHz. to 500 MHz. However, at the highest equivalent sweep speeds, the greatest usable frequency is limited by the response time of the circuits, not the number of channels. The 3 db. point is reached at 875 MHz and the frequency response rolls off smoothly above this, although it is still usable well beyond 2,000 MHz.

In the system of FIG. 3, each of the sampling units 37 and 39 may be, for example, a Tektronics Model 564 oscilloscope equipped with one Model 3S1 Dual-Trace Sampling Unit and a Model 3T77A Sampling Sweep Unit. The pulse generator 27 may be, for example, a General Radio Model 1,217B Pulser for generating the clock drive pulse, and the signal averager 15 may be, for example, a Princeton Applied Research "-Waveform Eductor." The multiplier 13 may be, for example, an Optical Electronics, Inc., Model 5,109 unit. and the final display unit 11 may be, for example, a Hewlett-Packard Model 175A oscilloscope. It should be understood that equivalent units of other manufacturers could be used, if desired, in a similar manner.

The circuit shown in the block diagram in FIG. 3 is by no means the only one possible. The sweep output of the sampling oscilloscope 37 could just as well be used to drive the display scope 11, or the ramp from the signal averager 15 could drive them both. Depending on the gain available in the multiplier and averager, it might be necessary to insert amplifiers after these stages. The signal averager could be replaced by either a passive RC network or an operational amplifier used as an RC integrator. Such an RC integrator could increase the resolution an order of magnitude beyond the 100 channels offered by the signal averager. On the other hand, any such RC network must have a time constant that is a small (<2 percent) fraction of the sweep time to avoid smearing any high fourier components.

It should be understood that the extremely slow clock rate, 1 kHz., for example, is chosen only partly because of frequency limitations of the multiplier. The output square waves from the sample-and-hold circuits arrive at the multiplier out of phase with each other by the value of $\tau$ at any particular instant. During this time $\tau$ the output of the multiplier is a signal of random amplitude which will average to zero in the integration process. As a result, the amplitude of the correlation function being generated in the averager will be decreased by a percentage equal to the fraction of the holding timer represented by $\tau$. The effect, of course, would be a linear decrease in amplitude from the left to the right edge of the trace. It could be compensated for, but it is simpler to merely hold the maximum value of $\tau$ to less than 1 or 2 percent of the clock time.

Operation of the correlator has been described as though all triggering and sampling operations took place in real time. They do not, and an understanding of this is important. The trigger circuits of the sweep units of the sampling oscilloscopes achieve their precise triggering ability at the expense of considerable delay. To compensate for this, the vertical amplifiers contain fixed delay cables which provide a delay greater than that introduced by the trigger circuits. The trigger circuits themselves then, contain a variable standoff time that is adjusted from a front panel control to place a pulse in the center of the screen at whatever sweep speed is being used. The variable standoff-time controls permit the trigger circuits of the two sampling oscilloscopes to be adjusted so that they are exactly synchronized. Variations in the delay of the two trigger circuits or variations in the effective lengths of cable used to deliver trigger pulses can thus be compensated for in the system. This process is accomplished by simply applying the same fast (<1 nsec.) rise-time pulse to both oscilloscopes and centering it independently on each screen. This adjustable standoff time also permits placing the time $\tau=0$ at any point on the screen (or off of it), allowing the correlation function to be examined both forward and backward in time. Since by definition $\Psi(\tau)$ must be symmetric about $\tau=0$, the symmetry (or lack of it) can be used as a ready check on both the operation of the system and for the presence of white noise in the correlation function.

Figure 4:
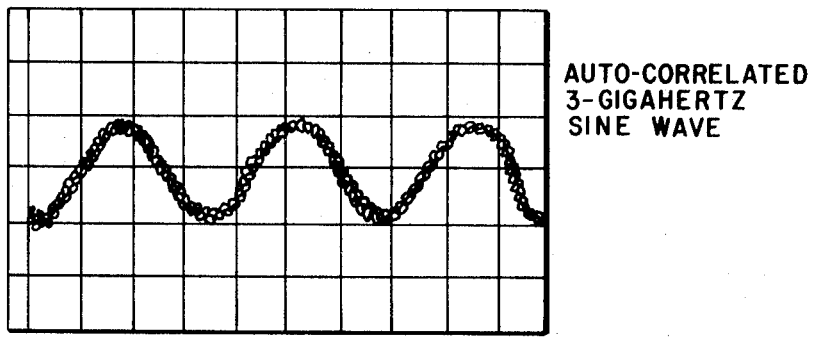
FIG. 4 is an autocorrelated 3 GHz sine wave signal.
Figure 5:
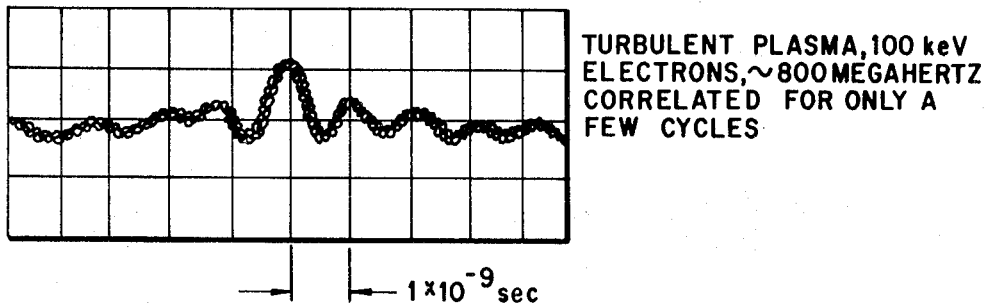
FIG. 5 is an autocorrelated function obtained from a plasma showing the presence of an 800 MHz oscillation.

FIGS. 4 and 5 are pictures taken from photographs that show what the system is capable of doing. FIG. 4 is an autocorrelated 3 GHz sine wave signal at an equivalent sweep speed of 0.1 nsec./cm. It was impossible to photograph the original 3 GHz output of the oscillator because the frequency is well above the point at which a sampling oscilloscope will deliver a stable trace. The relatively slow time period over which the correlator operates, however, was sufficient to provide the display of the correlation functions.

FIG. 5, also autocorrelation, shows the presence of an ~800 MHz oscillation in a turbulent plasma. From the picture it can be seen that the signal possesses correlation over a few cycles.

Although the present invention was primarily developed for use in plasma physics. It can perform correlations expected to be of value in microwave and radar signal transmission studies and interplanetary noise signal studies. In plasma physics it would be possible for the present invention to function as a control monitor. For example, it is well known that, in plasma situations, oscillations are always present and the present invention would be useful in examining plasma for the nature of its oscillations.

The high-frequency response and the flexibility of the invention allow studies to be made quickly in various applications and over a frequency range extended beyond that available in prior art correlators. It should be apparent also that the various components of the system as illustrated in FIG. 3 are not altered internally and can be conventionally used when desired for other applications.

It should be noted that the 3 GHz limit of the present invention is set by the sampling speed of the particular commercial units utilized therein as identified hereinabove. When faster sampling oscillators become available, correlations at higher bandwidths will be possible with the system of the present invention.

The present invention has been described by way of illustration rather than by way of limitation and it should be apparent ta it is equally applicable in fields other than those described.

We claim:

1. An automatic high-frequency signal correlator comprising a pulse generator, a first sampling oscilloscope provided with a first sample-and-hold circuit, said first oscilloscope having its horizontal sweep thereof set on "Manual," a second sampling oscilloscope provided with a time-delay generator and a second sample-and-hold circuit, said first and second sampling ocilloscopes coupled to said pulse generator for activation of said first sample-and-hold circuit of said first sampling oscilloscope and activation of said time-delay generator of said second sampling oscilloscope, the output of said time-delay generator being coupled to said second sample-and-hold circuit, a first source of signals to be sampled and being coupled to said first sample-and-hold circuit, and analogue multiplier, the output of said first sample-and-hold circuit coupled a one input to said analogue multiplier, a second source of signals to be sampled and coupled to said second sample-and-hold circuit, the output of said second sample-and-hold circuit coupled as a second input to said analogue multiplier, a signal averager coupled to the output of said analogue multiplier, a display oscilloscope coupled to the output of said signal averager, the sweep output of said display oscilloscope and as sweep input to said signal averager such that the sweeps are coordinated and the delay time for taking of samples will increase periodically in increments, whereby a plurality of output signals from said signal averager are displayed by said display oscilloscope to provide a visual correlation of the sample signals from said first and second source of signals.

* * * * *

PO-1050
(5/69)

UNITED STATES PATENT OFFICE
CERTIFICATE OF CORRECTION

Patent No. 3,621,223          Dated   November 16, 1971

Inventor(s) Igor Alexeff et al.

It is certified that error appears in the above-identified patent and that said Letters Patent are hereby corrected as shown below:

Column 1, line 3, before "INVENTION", insert ---THE---; line 36, delete "has", one occurrence; in the equation at line 74, over "$\Sigma$", "$11$" should read ---n---.

Column 2, line 23, "$(t_{i+}$" should read ---$(t_{i+1})$---; lines 38 and 39, "applied" should read ---applies---; line 52, before "proportional" insert ---(at each point)---; line 55, after "output" insert ---(the sawtooth)---; line 66, "scale" should read ---scales---; line 73, "include" should read ---includes---.

Column 3, line 18, after "sweep" insert ---(gate)---; line 19, "function" should read ---functions---.

Column 4, line 53, "$\tau - 0$" should read ---$\tau = 0$---.

Column 5, line 21, "ta" should read ---that---.

Column 6, line 4, "ociloscopes" should read ---oscilloscopes---; line 10, "and" should read ---an---; line 12, "a", first occurrence, should read ---as---; line 18, after "oscilloscope", insert ---coupled as an external sweep input to said second sampling oscilloscope---; line 20, after "for", insert ---the---.

Signed and sealed this 4th day of July 1972.

(SEAL)
Attest:

EDWARD M. FLETCHER, JR.            ROBERT GOTTSCHALK
Attesting Officer                  Commissioner of Patents